United States Patent
Yano

(10) Patent No.: US 12,523,523 B2
(45) Date of Patent: Jan. 13, 2026

(54) UNDERWATER NOISE MONITORING DEVICE, UNDERWATER NOISE MONITORING METHOD, AND STORAGE MEDIUM

(71) Applicant: NEC Corporation, Tokyo (JP)

(72) Inventor: Yutaka Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 428 days.

(21) Appl. No.: 18/019,143

(22) PCT Filed: Jun. 29, 2021

(86) PCT No.: PCT/JP2021/024443
§ 371 (c)(1),
(2) Date: Feb. 1, 2023

(87) PCT Pub. No.: WO2022/034748
PCT Pub. Date: Feb. 17, 2022

(65) Prior Publication Data
US 2023/0296426 A1  Sep. 21, 2023

(30) Foreign Application Priority Data
Aug. 13, 2020  (JP) .................. 2020-136553

(51) Int. Cl.
*G01H 9/00* (2006.01)
*H04R 23/00* (2006.01)

(52) U.S. Cl.
CPC ........... *G01H 9/004* (2013.01); *H04R 23/008* (2013.01)

(58) Field of Classification Search
None
See application file for complete search history.

(56) References Cited

FOREIGN PATENT DOCUMENTS

| | | | |
|---|---|---|---|
| JP | S59-046520 A | | 3/1984 |
| JP | 59148835 A | * | 8/1984 |
| JP | S59-148835 A | | 8/1984 |
| JP | S62-024116 A | | 2/1987 |
| JP | 2019-537721 A | | 12/2019 |
| WO | WO-2019044054 A1 | * | 3/2019 |

OTHER PUBLICATIONS

International Search Report for PCT Application No. PCT/JP2021/024443, mailed on Aug. 24, 2021.
English translation of Written opinion for PCT Application No. PCT/JP2021/024443, mailed on Aug. 24, 2021.
(Continued)

*Primary Examiner* — Eric S. McCall
*Assistant Examiner* — Nigel H Plumb
(74) *Attorney, Agent, or Firm* — Sughrue Mion, PLLC

(57) ABSTRACT

In order to facilitate the disposition of multiple noise measuring points in a distributed manner, this underwater noise monitoring device is provide with: a processing unit in which, by using data which was acquired using optical fibers installed underwater or on a bottom of water and which indicates noise or vibration at the position of each of the optical fibers, a statistical value of the amount of noise or vibration is derived at the time and the place when/where the data was acquired; and an output unit that outputs the statistical value.

16 Claims, 7 Drawing Sheets

(56) References Cited

OTHER PUBLICATIONS

ISO18406:2017, "Underwater acoustics—Measurement of radiated underwater sound from percussive pile driving", First edition, Apr. 2017.
R. Posey Jr, G. A. Johnson and S.T. Vohra, "Strain sensing based on coherent Rayleigh scattering in an optical fibre", Electronics Letters, Sep. 28, 2000, vol. 36 No. 20, pp. 1688 to 1689.

* cited by examiner

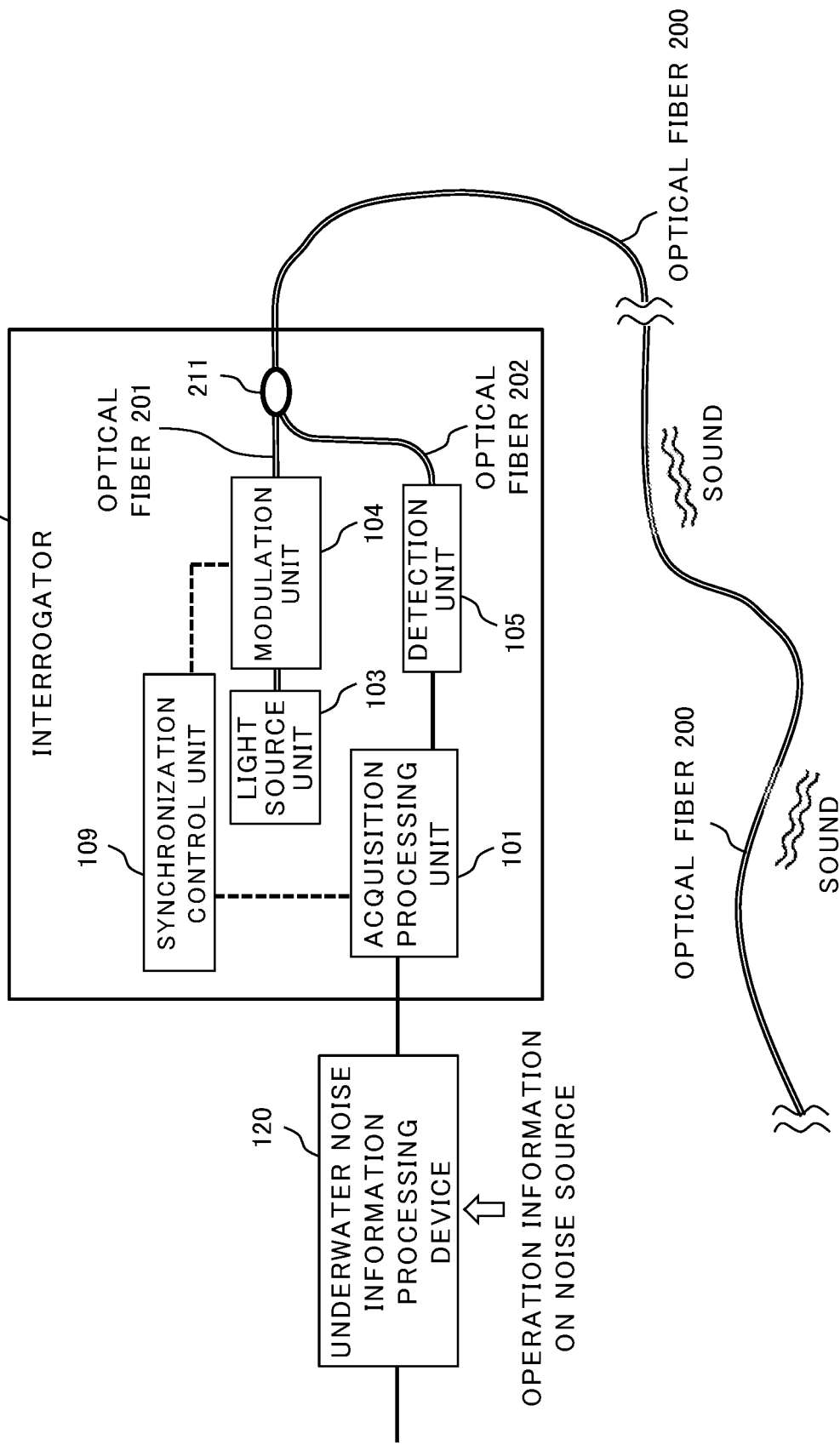

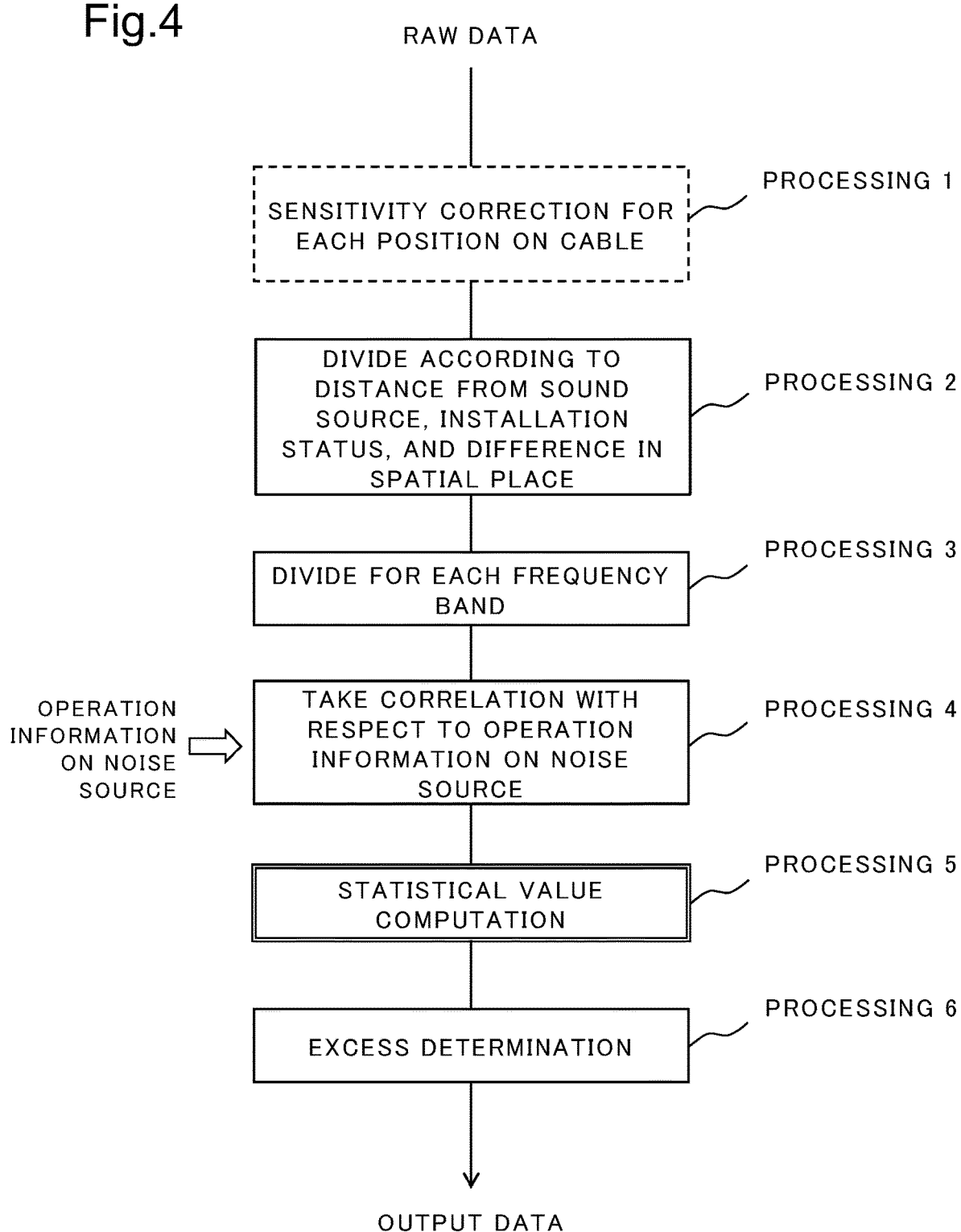

UNDERWATER NOISE MONITORING DEVICE, UNDERWATER NOISE MONITORING METHOD, AND STORAGE MEDIUM

This application is a National Stage Entry of PCT/JP2021/024443 filed on Jun. 29, 2021, which claims priority from Japanese Patent Application 2020-136553 filed on Aug. 13, 2020, the contents of all of which are incorporated herein by reference, in their entirety.

TECHNICAL FIELD

The present invention relates to a system that monitors underwater noise and vibration.

BACKGROUND ART

Various noises and vibrations are generated underwater by marine activities of people. In the following, noise and vibration may be simply referred to as "noise". Further, sound and vibration may be simply referred to as "sound". It is known that a marine ecosystem is adversely affected depending on a type or magnitude of noise. Such noise includes, for example, a sound caused by a seabed piling work for an offshore wind power plant, a sound from an air gun for exploration of a seabed underground structure, a sailing sound of a ship, and the like. There is a report on a phenomenon that plankton in a vicinity dies due to a sound from an air gun. When plankton dies, the number of fish and the like that feed on plankton also temporarily decreases, which also affects fishery.

In view of a background as described above, underwater noise regulation has been internationally considered. For example, in ISO, underwater noise has been discussed in TC43/SC3, and standardization is in progress. Herein, ISO is abbreviation of International Organization for Standardization. For example, NPL 1 is a standards document related to a measuring method of underwater noise when a piling work for seabed is carried out.

Further, regarding a sailing sound of a ship, IMO recognizes necessity of action for reducing the sailing sound, and has issued a guideline on a reducing method and a measuring method in 2014. IMO is abbreviation of International Maritime Organization.

In a standard measuring method described in these documents, an underwater acoustic sensor (underwater microphone) called a hydrophone is used for acquisition of an underwater sound. However, since a reflective wave is generated in a shallow sea or in a bay, and reflective waves overlap one another in a complicated manner, it is difficult to recognize a noise distribution status in a vicinity with a small number of measuring points (acquisition positions of sound data). A standardized measuring method and a regulation value are necessary for noise regulation, and discussion about a measuring method and a regulation value with which a regulatory compliance can be determined in a condition where such complicated multiple reflections occur is still in progress.

[General Noise Measurement]

In today's society, there are various regulations for preventing environmental deterioration, not limited to noise, and there are two ways of regulating methods, namely, regulation for each individual source of generation, and total amount regulation in a predetermined section, thus environmental deterioration is prevented by combining these regulations. A similar measure is also applied to underwater noise, and regulation for each individual noise source (e.g., a ship, a piling machine, and an air gun), and total amount regulation in a specific sea area (e.g., noise in a strait where ship traffic is heavy) have been discussed and examined.

Measurement of an amount of noise generation in an individual noise source can be performed by installing a noise source at a place where surroundings are quiet, and performing measurement. For example, when a sound source moves, as in a case of noise caused by sailing of a ship, a method is employed in which a section for noise measurement where a sufficient number of measuring points are installed at places where an influence of reflection is small is prepared, and noise is measured by allowing a ship to pass.

Meanwhile, noise measurement in a specific section is basically determining whether an amount of noise (amount of noise and vibration) on-site satisfies a regulation value. Therefore, a content of a sound or a distance to a sound source is not used for this determination. However, in a case in which a regulation value is exceeded, a main generation source of noise or a distance to a sound source is examined in order to reduce the noise. In view of the above, at a time of measurement, measuring an amount of noise is also required while recognizing a positional relation between a target main noise source (in most cases, an artificial sound source) and a measuring point.

In other words, there are two forms of noise environment measurement, namely, a form in which only a total amount of noise is monitored regardless of a type or a position of a noise source, and a form in which noise is monitored while recognizing a positional relation between a target main noise source (in most cases, an artificial sound source) and a measuring point.

In particular, regarding an artificial noise source of which noise is likely to become a problem, an amount of noise is generally monitored by disposing a noise measuring point at a position away from a sound source by a predetermined distance before a sound is emitted. In this way, on-site noise environment measurement becomes measurement in which the above-described measurement for each noise source and the total amount measurement in an on-site environment are combined. In other words, determination is made as to whether a total amount in which a sound from a sound source of which a type and a distance are recognized is added to a surrounding sound other than the above satisfies an environmental standard.

Regarding an artificial noise source, there are a case in which a sound source does not move, such as a case of construction noise, and a case in which a sound source moves, such as a case of noise from a sailing ship. Even for a moving sound source, it is possible to recognize a distance between each sound source and a measuring point by acquiring information from a system that recognizes a position of the sound source in real time. For example, as a system that recognizes position information of a ship, an automatic identification system (AIS) has been widely employed.

Japanese Patent Application No. 2020-013946 discloses a method of acquiring a sound in a periphery of an optical fiber by distributed acoustic sensing (DAS).

Further, NPL 2 discloses a principle of DAS.

CITATION LIST

Non Patent Literature

[NPL 1] ISO18406: 2017, Underwater acoustics—Measurement of radiated underwater sound from percussive pile driving

[NPL 2] R. Posey Jr, G. A. Johnson and S. T. Vohra, "Strain sensing based on coherent Rayleigh scattering in an optical fibre", ELECTRONICS LETTERS, 28th September 2000, Vol. 36 No. 20, pp. 1688 to 1689

SUMMARY OF INVENTION

Technical Problem

As described in the section of Background Art, in order to investigate a distribution of underwater noise, when complicated propagation of a sound, such as multiple reflections, is taken into consideration, it is desirable to monitor by disposing measuring points as many as possible in such a way as to surround a sound source. However, in observation using a hydrophone described in the section of Background Art, there is a constraint as to disposing measuring points in a distributed manner by increasing the number of measuring points. A reason for this is that there are a problem on availability (long-term reliability) including poor insulation, and electric power supply since a hydrophone is a sensor constituted of an electronic circuit, a problem, in a case in which measuring points are not wire-connected, that it takes time and effort to collect data stored inside since a radio wave does not reach underwater, a problem that a cost sharply rises when the number of measuring points is increased in order to perform distributed measurement, and the like.

For these reasons, nowadays, an attempt has been started from noise regulation for each individual generation source. However, there is still necessity of recognizing an on-site noise environment. For example, noise generated by an individual ship changes depending on a velocity (number of rotations of an engine or a propeller), a maintenance status, and the like. Further, a total amount of noise in a specific sea area changes depending on a type or a number of ships passing through the specific sea area at the same time. Therefore, it is insufficient to protect an environment only by regulating an individual noise source. Therefore, it is conceived that, in the future, there is necessity of spreading a measuring point in a distributed manner in order to monitor noise in an actual sea area where a ship sails.

An object of the present invention is to provide an underwater noise monitoring device and the like that facilitate disposing a large number of noise measuring points in a distributed manner.

Solution to Problem

An underwater noise monitoring device according to the present invention includes a processing unit that derives, by using data representing noise or vibration at each position of an optical fiber installed underwater or on a bottom of water, the data being acquired by the optical fiber, a statistical value of an amount of the noise or vibration at a time and a place when and where the data are acquired; and an output unit that outputs the statistical value.

Advantageous Effects of Invention

An underwater noise monitoring device and the like according to the present invention facilitate disposing a large number of noise measuring points in a distributed manner.

BRIEF DESCRIPTION OF DRAWINGS

FIG. 1 is a conceptual diagram illustrating a configuration example of an underwater noise monitoring system according to a present example embodiment.

Each of FIG. 2A

Each of FIG. 3A

FIG. 4 is an explanatory diagram of a processing content of an underwater noise information processing device.

Each of FIG. 6A

EXAMPLE EMBODIMENT

An underwater noise monitoring device and the like according to the present example embodiment monitors underwater noise by using DAS described in the section of Background Art, and by using an optical fiber included in an optical cable installed in underwater. Thus, the underwater noise monitoring device according to the present example embodiment facilitates disposing a large number of noise measuring points (acquisition positions of sound data) in a distributed manner.

Configuration and Operation

FIG. 1 is a conceptual diagram illustrating a configuration of an underwater noise monitoring system 300, which is an example of the underwater noise monitoring system according to the present example embodiment. The underwater noise monitoring system 300 includes an optical fiber 200, an interrogator 100, and an underwater noise information processing device 120. The interrogator 100 and the underwater noise information processing device 120 may be integrated.

In the present example embodiment, the optical cable including the optical fiber is an optical cable manufactured for environmental noise measurement as at least one of purposes, and is installed for measurement in a section where noise is measured.

For a purpose of optical fiber sensing, only an optical fiber core wire is required to be in an optical cable, and an electrical wire for electric power supply or signal transmission is not required. Excluding an electric wire can make it less likely that a failure or the like due to poor insulation occurs.

[Layout of Optical Cable]

Figure 2A:
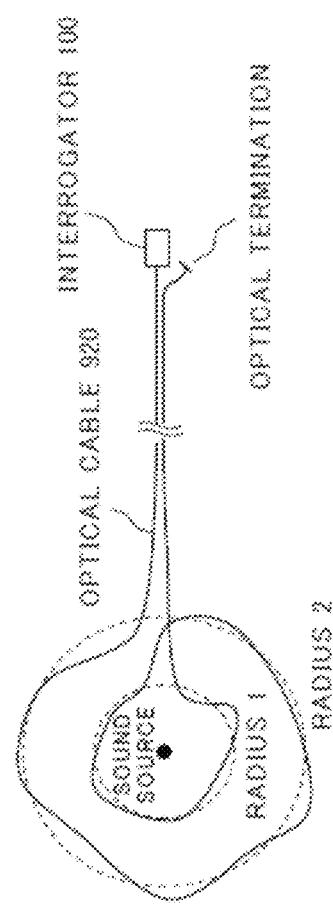
FIG. 2B is a conceptual diagram illustrating an example of a way (horizontal direction) of installing an optical cable of the underwater noise monitoring system.
Figure 2B:
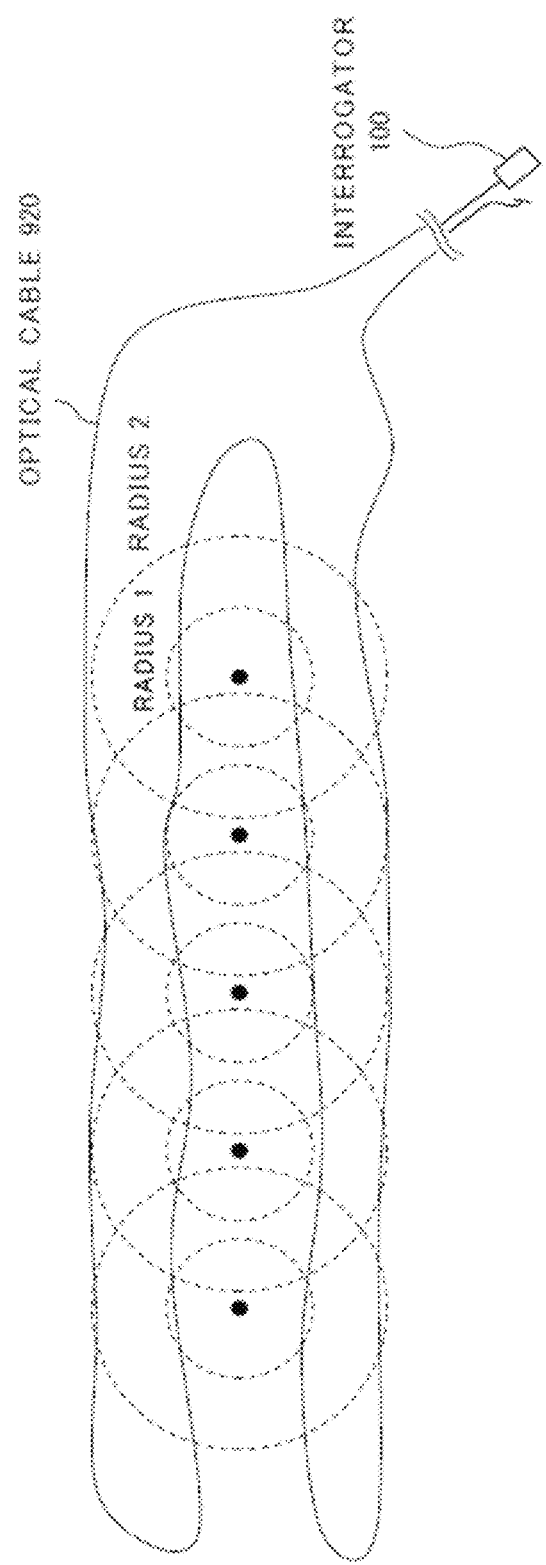

Each of FIG. 2A and FIG. 2B is a conceptual diagram illustrating an installation example of an optical cable 920 in the underwater noise monitoring system 300 in FIG. 1. The optical cable 920 is installed in a manner of one-stroke writing in such a way that a measuring point (acquisition position of sound data) is aligned at a position away from a sound source by a prescribed distance. Each of FIG. 2A and FIG. 2B is an example in a case in which a noise source does not move, as in a case in which a sound source is a construction site, and in which noise monitoring is required at distances 1 and 2 from the sound source.

In a case where the number of sound sources is one, as illustrated in FIG. 2A, an optical cable is installed in such a way that concentric circles having a radius 1 and a radius 2 is drawn in a manner of one-stroke writing. In a case where a plurality of windmills (sound sources) are aligned as in an offshore wind power plant farm, as illustrated in FIG. 2B, an optical cable is disposed in such a way as to pass through a position away by the distance 1 and the distance 2 in parallel with a row of sound sources. For example, also in a case where a sailing sound of a ship is measured in a strait, an optical cable layout as illustrated in FIG. 2B is appropriate.

In the underwater noise monitoring system illustrated in FIG. 1, either one of both ends of an optical fiber is required to be connected to the interrogator 100, the other end may be set as an optical termination, and it is not required that both ends are connected to the interrogator. In the example in each of FIG. 2A and FIG. 2B, after both ends of an optical cable are returned to the interrogator, one end is connected to the interrogator and the other end is terminated, in order that measurement can be performed from the opposite connection end even when the optical cable is disconnected. In each of FIG. 2A and FIG. 2B, illustration of the underwater noise information processing device 120 in FIG. 1 is omitted.

The interrogator 100 and the underwater noise information processing device 120 may be installed on a land, or may be installed in a ship such as a patrol boat. It is desirable that these devices may be installed at a place where a person in charge of noise monitoring can monitor in real time. The underwater noise information processing device 120 may be installed near or away from the interrogator 100.

[Form of Installation of Optical Cable in Vertical Direction]

Figure 3A:
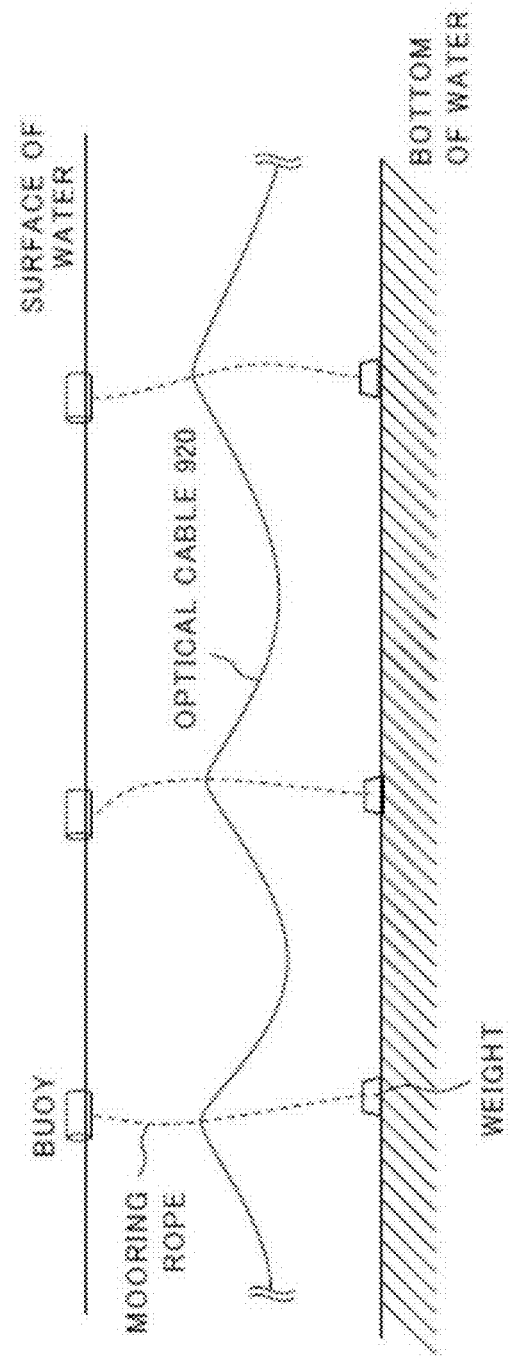
FIG. 3B is a conceptual diagram illustrating an example of a way (vertical direction) of installing an optical cable of the underwater noise monitoring system.
Figure 3B:
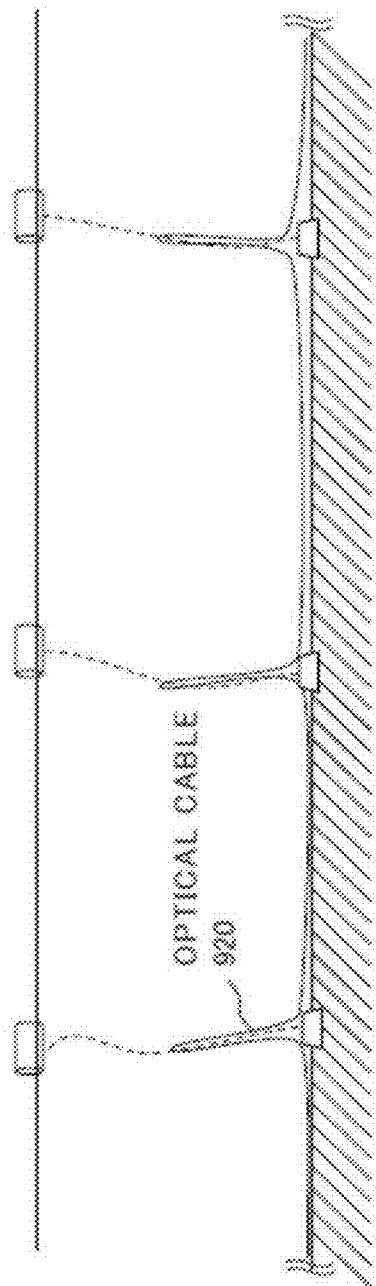

Each of FIG. 3A and FIG. 3B is a conceptual diagram illustrating an example of a way of installing the optical cable 920 in a vertical direction with respect to a water surface. The optical cable 920 may be placed on a bottom of water, or may be buried in a bottom of water. In order to dispose a measuring point in underwater, the optical cable 920 may be lifted underwater by using a mooring buoy or the like. Since a direct wave may be blocked by undulation of the ground at a position near a bottom of water, there is a case that a measuring point may preferably be set away from a bottom of water.

FIG. 3A illustrates a layout example of the optical cable 920 in which most sections of the optical cable 920 are suspended underwater. Further, FIG. 3B illustrates a layout example of the optical cable in which a major part of the optical cable 920 is placed on a bottom of water, and a part thereof is lifted in such a way as to measure underwater. In this way, an appropriate installation method of the optical cable 920 is selected according to a water depth of a monitoring site, or the like.

In a case of a piling work, there is also vibration transmitted through the ground of a bottom of water, in addition to an underwater sound emitted from a pile, and the vibration transmitted through the ground can also be monitored by disposing an optical cable on the bottom of water.

In an underwater construction site, there is a case in which a silt curtain for suppressing spread of soaring mud or the like is used, and an optical cable may be mounted on such a structure in a periphery of the construction site.

As described above, an optical cable for measurement acquires sound data at a variety of places such as places near and far of a periphery of a sound source, and at a height from a bottom of water. Since accurate information such as an installation position (geographical coordinate including a water depth) and an installation status of an optical cable becomes important information when a measured sound is analyzed, the information should be accurately recorded when the optical cable is installed. Hereinafter, this record is also referred to as "geographical coordinate data of an optical cable".

[Measurement of Distance between Sound Source and Measuring Point]

Even when a distance between an optical cable and a sound source is slightly deviated from a prescribed distance, as far as a deviation amount of the distance is known, a measurement value can be corrected to a measurement value at the prescribed distance. A distance between a sound source and an optical cable can be actually measured in advance as follows. A pulse sound source is placed at a point where a noise source is present, and a distance is derived from a time until a pulse sound from the pulse sound source is detected at each point of an optical cable. A pulse width is set to a sufficiently narrow value in such a way that a direct wave and a reflective wave can be distinguished.

However, in this correction method, when a distance deviation increases, a measured amount of noise may become inaccurate since a phenomenon that an influence of a reflective wave differs at each place of measurement appears. Installation at a position close to a prescribed distance as much as possible is desired.

[Operation of Interrogator 100]

The optical fiber 200 is a general optical fiber used for optical transmission or the like. A general optical fiber generates backscattered light that has been changed by an environment such as presence of vibration including a sound. The backscattered light is typically due to Rayleigh backscattering. In this case, the above-described change is mainly a change in a phase (phase change).

The optical fiber 200 may be a plurality of optical fibers connected by an amplifying repeater or the like. An optical cable including the optical fiber 200 may be connected between an unillustrated optical communication device including the interrogator 100, and another optical communication device.

The interrogator 100 is an interrogator for performing optical fiber sensing according to an OTDR method. Herein, OTDR is abbreviation of optical time-domain reflectometry. An interrogator as described above is, for example, described in the above-described Japanese Patent Application No. 2020-013946.

The interrogator 100 includes an acquisition processing unit 101, a synchronization control unit 109, a light source unit 103, a modulation unit 104, and a detection unit 105. The modulation unit 104 is connected to the optical fiber 200 via an optical fiber 201 and an optical coupler 211, and the detection unit 105 is connected to the optical fiber 200 via the optical coupler 211 and an optical fiber 202.

The light source unit 103 includes a laser light source, and inputs continuous laser light to the modulation unit 104.

The modulation unit 104, for example, amplitude-modulates the laser light, which is continuous light input from the light source unit 103, in synchronization with a trigger signal from the synchronization control unit 109, and generates probe light having a sensing signal wavelength. The probe light is, for example, in the form of a pulse. The modulation unit 104 transmits the probe light to the optical fiber 200 via the optical fiber 201 and the optical coupler 211.

The synchronization control unit 109 also sends a trigger signal to the acquisition processing unit 101, and conveys which part of data sequentially input after being analog-to-digital (A/D) converted is a time origin.

When the transmission is performed, return light from each position of the optical fiber 200 reaches the detection unit 105 via the optical fiber 202 from the optical coupler 211. The return light from each position of the optical fiber reaches the interrogator 100 within a shorter time after transmission of probe light is performed, as the position where the return light is from is nearer to the interrogator 100. In a case where a certain position of the optical fiber 200 is affected by an environment such as presence of a sound, a change from probe light at the time of transmission occurs in backscattered light generated at the position due to the environment. In a case in which the backscattered light is Rayleigh backscattered light, the change is mainly a phase change.

The return light in which the phase change has occurred is detected by the detection unit 105. As methods of the detection, well-known synchronous detection and delay detection are available, and either method may be employed. Since a configuration for performing phase detection is well-known, description thereof is omitted herein. An electrical signal (detection signal) acquired by detection is a signal that represents a degree of phase change by an amplitude or the like. The electrical signal is input to the acquisition processing unit 101.

First, the acquisition processing unit 101 A/D converts the above-described electrical signal into digital data. Next, a phase change of light returning after being scattered at each point of the optical fiber 200 from previous measurement is derived, for example, in a form of a difference with respect to previous measurement at a same point. Since this signal processing is a general DAS technique, detailed description thereof is omitted.

The acquisition processing unit 101 derives data of a similar shape to that acquired by virtually aligning dot-shaped electrical sensors in a beaded manner at each sensor position of the optical fiber 200. These pieces of data are virtual sensor array output data, which are acquired as a result of signal processing. Hereinafter, for simplification of description, these pieces of data are referred to as RAW data. The RAW data are also data representing an intensity of a sound detected by the optical fiber at each point (sensor position) of the optical fiber 200 at each time. Regarding RAW data, for example, there is description in a section of Background Art of the above-described Japanese Patent Application No. 2020-013946. The acquisition processing unit 101 outputs the RAW data to the underwater noise information processing device 120.

[Operation Overview of Underwater Noise Information Processing Device 120]

While details on a configuration and an operation of the underwater noise information processing device 120 are described later with reference to FIGS. 4 to 6, an overview thereof is described herein.

The underwater noise information processing unit 120 acquires the RAW data input from the acquisition processing unit 101. As described above, the RAW data are also data representing an intensity of a sound detected by the optical fiber at each point (sensor position) of the optical fiber 200 at each time.

First, the underwater noise information processing device 120 associates geographical coordinate data at which an optical cable is installed with position information of each measuring point expressed by a position (e.g., a distance from an end of optical cable) on the optical cable.

Subsequently, the underwater noise information processing device 120 analyzes the acquired RAW data, and determines whether noise does not exceed a regulation value.

The underwater noise information processing device 120 records a noise level, an analysis result, and a determination result at each time and at each position, and outputs them to, for example, a display or the like.

[Analysis/Evaluation of Noise]

FIG. 4 is a conceptual diagram illustrating a data processing example of noise analysis/evaluation performed by the underwater noise information processing device 120. Among pieces of processing from processing 1 to processing 6, processing considered to be performed in most of application scenes is processing 5, and there is a case that processing other than the processing 5 is not performed since the pieces of processing are processing for improving noise analysis performance or additional function processing. In a case in which certain processing is not performed, data processed in previous processing become data to be processed in next processing as it is.

Herein, for convenience of explanation, processing is described in the order of pieces of processing 5, 6, and 3. Further, a content of "sensitivity correction for each position on an optical cable" in the processing 1 is described in a second example embodiment.

The above-described RAW data are input from the acquisition processing unit 101 in FIG. 1 to the underwater noise information processing device 120. As described above, the RAW data are data representing an instantaneous intensity (waveform) of a sound detected by the optical fiber at each time, and at each point (sensor position) of the optical fiber 200.

"Processing 5: statistical value computation" is processing to be performed in most of application scenes. The underwater noise information processing device 120 computes, for each measuring point, a statistical value of an instantaneous intensity (waveform) of detected noise for each set time, regarding, when processing 3 to be described later is performed, data divided for each frequency band.

The statistical value mentioned herein is a value acquired by computing a representative value of an instantaneous intensity of a sound in a set time width. A statistical value of an intensity is, for example, an average value or a peak value. The statistical value may be computed after an arithmetic operation is added to an instantaneous intensity (waveform) of a sound. The set time width is, for example, 10 seconds. In a case where processing of dividing for each frequency band to be described in processing 3 is performed, a set time width is set for each frequency band. For example, in a band from 1 to 10 Hz, a time width is set to 100 seconds, and in a band from 10 to 100 Hz, a time width is set to 10 seconds.

By computing a statistical value, specifically, a representative value as described above, a data size becomes remarkably small as compared with an instantaneous intensity (waveform) of a sound. Further, this makes it easy to perform threshold value excess determination, which is described next.

"Processing 6: excess determination" is processing that is selected to be implemented or not according to an application status of the underwater noise monitoring system 300 in FIG. 1.

The underwater noise information processing device 120 evaluates as necessary whether a designated threshold value is excessed, by using analysis data acquired as described above. The analysis data are, for example, an average value or a peak value. The designated threshold value is typically a noise regulation value.

"Processing 3: dividing for each frequency band" is processing that is selected to be performed or not according to an application status of the underwater noise monitoring system 300 in FIG. 1.

A content of "dividing for each frequency band" regarding sound data in processing 3 is, for example, dividing into a frequency band from a very low frequency to 0.1 Hz, from 0.1 to 1 Hz, from 1 to 10 Hz, from 10 to 100 Hz, and 100 Hz or more. It is desirable to perform this frequency band settings in accordance with noise regulation.

There are roughly two reasons for evaluating noise by dividing for each frequency band. One is that an influence affecting underwater life differs depending on a frequency band of noise. The other is to distinguish a frequency included in noise. For example, there is a case in which artificial noise such as noise from a construction work is desired to be monitored at a place where noise derived from the nature is loud, such as a place where waves are crashing against a shore. Dividing noise for each frequency band, and evaluating noise at a frequency in which noise derived from the nature is not loud and a sound generated from construction machinery is loud enables to reduce an influence imparted to evaluation of artificial noise by noise derived from the nature. For the reasons as described above, it is a common practice to specify a frequency band in noise regulation, and to regulate noise within the specified frequency band. Therefore, processing of evaluating by dividing noise for each frequency band is performed as necessary.

Figure 5:
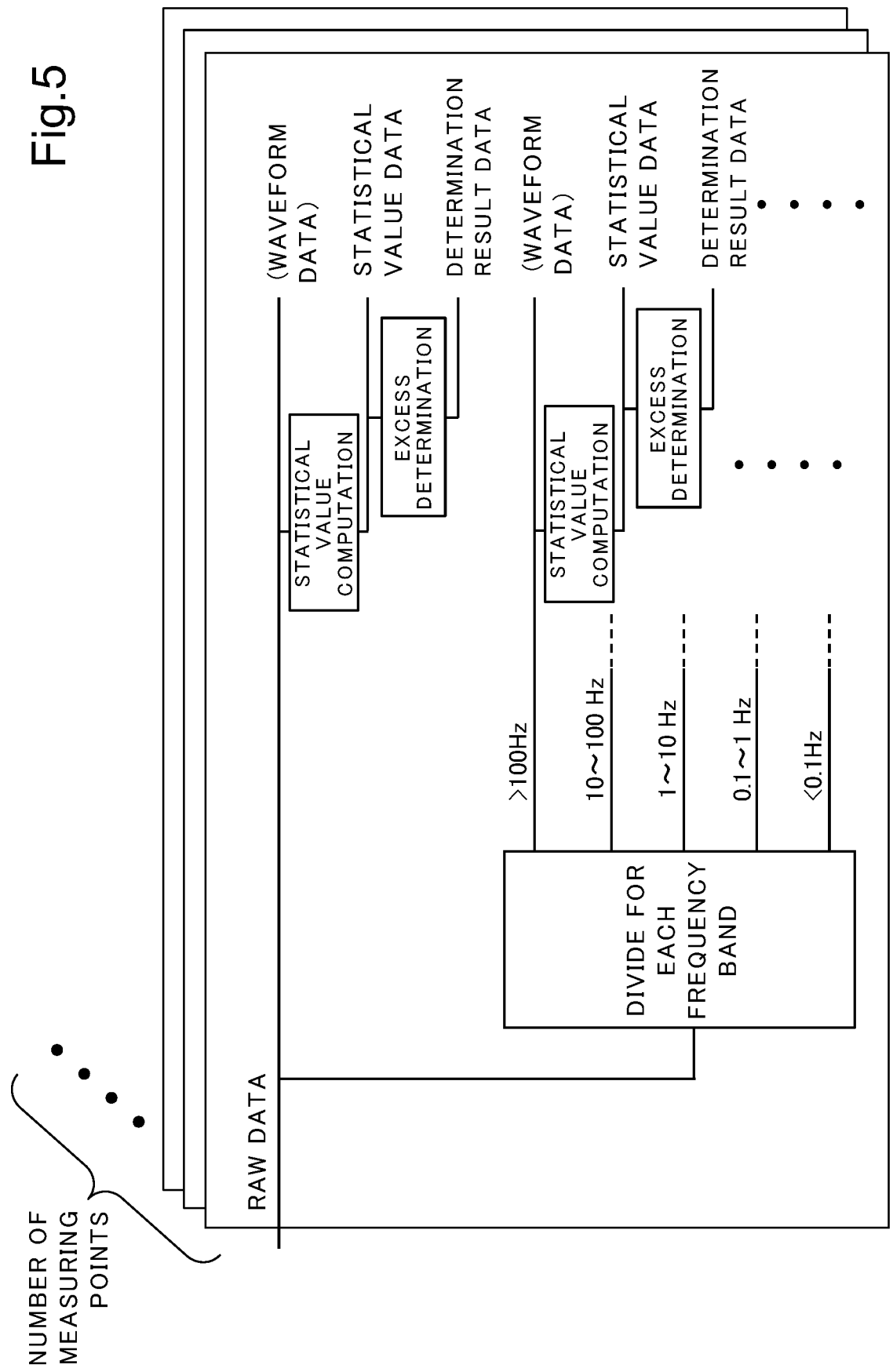
FIG. 5 is an explanatory diagram of details of a processing content of the underwater noise information processing device.

FIG. 5 is a diagram schematically illustrating one example of a flow of data in the pieces of processing 3, 5, and 6 described above. RAW data are divided and branched into a plurality of pieces of data by being divided for each frequency band. RAW data are input from the left side in FIG. 5, and a result after processing RAW data is output to the right side. An uppermost row represents data in which RAW data are processed without being divided for each frequency band, and there are three types of output forms: data are output without being processed, a statistical value is computed and output, and a result acquired by further performing threshold value excess determination on a statistical value is output. A data size of data to be output becomes small in an order of waveform data, statistical value data, and determination result data. Which one of these is to be recorded is changeable according to settings. Similar processing is also performed after RAW data are divided for each frequency band. The foregoing processing is performed with respect to RAW data from one measuring point. This processing is performed the same number of times as the number of measuring points being a large number. Since processing data at a measuring point where usefulness is low is not efficient, processing in FIG. 5 is performed regarding pieces of processing 1 and 2 to be described later by narrowing down to a measuring point where data processing is necessary.

"Processing 2: dividing according to a difference in distance from a sound source, in an installation status, and in a spatial place" is processing that is selected to be implemented or not according to an application status of the underwater noise monitoring system 300.

The underwater noise information processing device 120 holds at least a geographical coordinate of each measuring point, and also holds a geographical coordinate of a sound source in some cases. The number of sound sources is not limited to one, and may be more than one. When a sound source is a sound source that does not move such as a piling machine, a geographical coordinate of the sound source is fixedly set and held. On the other hand, when a sound source is a moving sound source such as a sailing ship, a geographical coordinate of the sound source is acquired from a ship position information system, for example, an AIS and the like, and is held.

The underwater noise information processing device 120 selects and analyzes a measuring point, based on a distance between a sound source and each measuring point, and an installation status. One example thereof is described regarding an installation example in FIG. 2A. In this installation example, the optical cable 920 is installed in such a way as to surround a noise source in double. Herein, it is assumed that the radius 1 is 250 m, and the radius 2 is 500 m.

Figure 6A:
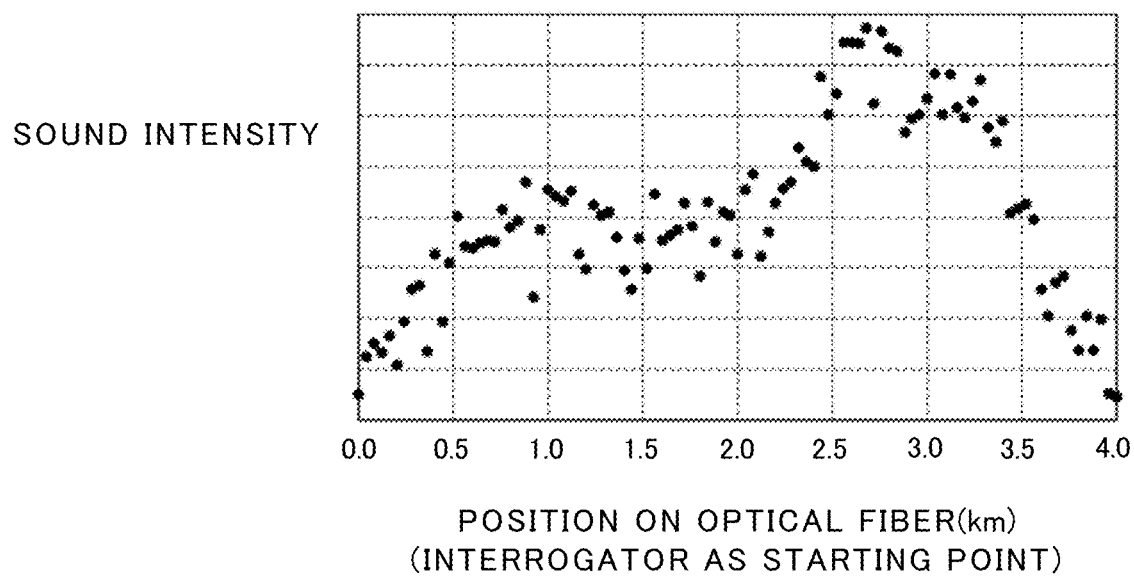
FIG. 6B is one example of data representing an advantageous effect of processing by the underwater noise information processing device.
Figure 6B:
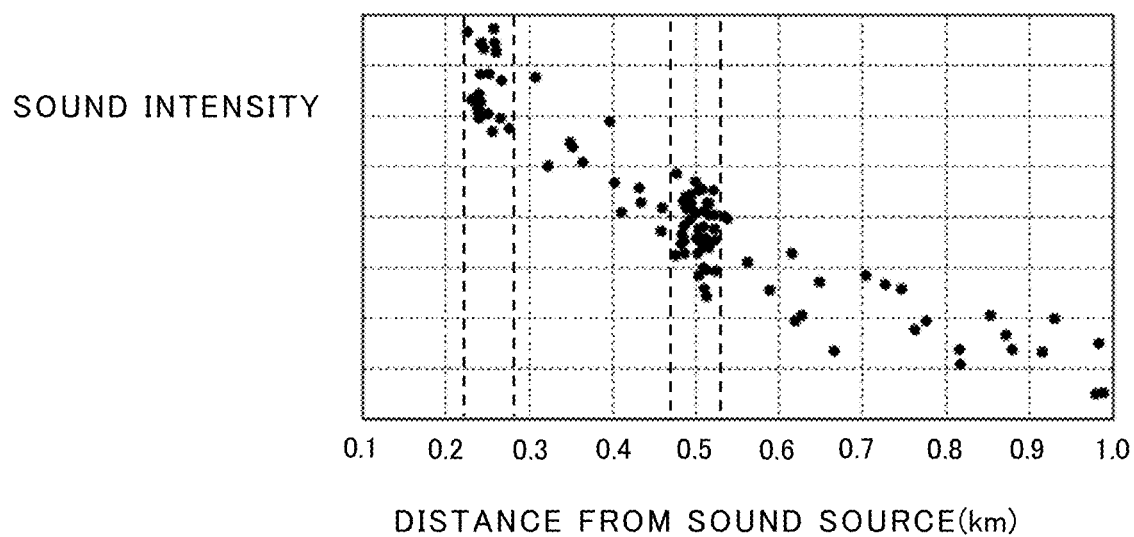

FIG. 6A is a diagram in which an average value of a sound intensity measured at a certain time is plotted in an order of a position on the optical cable 920. FIG. 6B is a diagram in which the same data are plotted in an order of a distance from a sound source to each measuring point. As is clear from FIG. 6B, measuring points are concentrated at positions away from the sound source by 250 m (radius 1) and 500 m (radius 2). As described above, since these two distances are prescribed distances when noise is measured, data from measuring points at these two distances are useful, and it is also possible to omit processing thereafter regarding data at measuring points other than the above. Measuring points at these two distances are corrected to values at the distances 250 m and 500 m with respect to a slight distance deviation, and then averages and the like of the values are taken and output as an amount of noise at a place away from a sound source by a prescribed distance. The example in FIG. 6B illustrates a usage manner in which a distance is corrected as necessary regarding a measuring point within a range of ±30 m from the prescribed distance.

Further, as illustrated in FIG. 2B as one example, there is a case in which a plurality of noise sources are present at spatially different places, and noise emitted from these positions is overlapped timewise and detected at a plurality of places of an optical cable. In this case, not only an amount of noise can be monitored at each measuring point, it is also possible to spatially separate/identify a noise source by utilizing an elongated optical fiber itself as a sensor array and by using a well-known sound source separating technique. This enables to acquire information indicating noise from which noise source is to be reduced in order to suppress noise at each measuring point within a noise regulation value. Further, it is also possible to estimate an amount of noise at each measuring point, excluding noise from a noise source at a specific place. The sound source separating technique mentioned herein is, for example, a beam forming technique.

"Processing 4: taking a correlation with respect to operation information on a noise source" is processing that is selected to be implemented or not according to an application status of a noise monitoring system 300.

Analysis in which a correlation with respect to operation information on an artificial noise source is added to the above-described noise observation data is effective.

For example, in a case in which there is time when a construction machine makes noise and there is time when the construction machine seldom makes noise depending on an operation state, considering a correlation with respect to information on an operation state makes it possible to accurately evaluate a noise value (amount of noise and vibration) in each operation state, and to clearly indicate an amount of increase of noise when noise is made. As a specific processing method, for example, sound data are evaluated after being divided into sound data at an operating time and a non-operating time of a noise source.

There is a case that absence of information on an operation state make it impossible to accurately evaluate a long-term average value of noise observation data because the long-term average value becomes an average value of data when noise is present and data when noise is not present. Further, a peak value may fluctuate, and it becomes difficult to know a peak value when noise is made. Adding operation information on an artificial noise source is particularly effective when an intensity difference between data when noise is present and data when noise is not present is not clear.

In a case in which an intensity difference between data when noise is present and data when noise is not present is clear, for example, in impulse-like noise such as noise from an air gun, sound data can be determined from noise itself regardless of absence of operation information on the noise source. A reason for this is that an intensity waveform before being triggered can also be included in evaluation by constantly overwriting and holding in a ring memory in the same manner as self-trigger in an oscilloscope.

[Output Processing]

The underwater noise information device 120 in FIG. 1 records the foregoing analysis result in a database or the like, which is included inside or outside the underwater noise information device 120, as necessary, for later reference.

Herein, it may be possible to record original sensing data (before being divided into each frequency band) representing noise altogether. The original sensing data can be utilized, for example, in a case in which the sensing data are desired to be analyzed in detail later, for example, off-line. Data to be recorded are desired to have a specification that enables refined settings of an operation according to a usage or a status, as described above.

The underwater noise information device 120 in FIG. 1 outputs these pieces of analysis data and an evaluation result, for example, according to instruction information from outside. An output destination pertaining to the output is, for example, an external display, printer, or communication device.

The underwater noise information processing device 120 may further include the following processing or function. The processing or function is, for example, mapping visualization processing combined with map information. The processing or function is alternatively, for example, a function of analyzing a history accumulated in a database. This enables to, for example, recognize a trend of a long-term change of noise, compare before and after start of a construction work, and the like.

[Automatic Noise Suppression by Cooperation with External System]

Further, the underwater noise monitoring system 300 may not only display or notify that a prescribed value is exceeded, but may also perform control of maintaining a state that an amount of noise on-site is below the prescribed value, in cooperation with an external system. In the case, the underwater noise information processing device 120 sends, to the external system, control information for maintaining the state that an amount of noise on-site is below the prescribed value.

For example, in a case of regulating noise in a certain sea area, the control is to limit a velocity of a ship, limit a traffic volume, and the like, in such a way that the noise becomes equal to or less than the prescribed value.

Advantageous Effect

An underwater noise monitoring system according to the present example embodiment facilitates disposing a large number of noise measuring points in a distributed manner as described above, since an optical cable is used as an underwater acoustic sensor. By facilitating disposing a large number of measuring points, the underwater noise monitoring system according to the present example embodiment reduces labor of monitoring underwater noise propagating in a complicated manner due to multiple reflections, submarine topography, bottom sediment, or the like. Further, using the optical cable as a sensor array facilitates monitoring while distinguishing a plurality of noise sources.

Since the underwater noise monitoring system according to the present example embodiment does not require an electronic circuit for an underwater acoustic sensor, a poor insulation failure does not occur, which facilitates maintaining a monitoring network in a wide range and for a long term.

Second Example Embodiment

A second example embodiment is an example embodiment in which underwater noise monitoring is performed by using an optical cable that is not installed for the purpose of underwater noise monitoring. Hereinafter, a point in which an underwater noise information processing device 120 according to the present example embodiment differs from the underwater noise information processing device 120 according to the first example embodiment is mainly described.

[Utilization of General Optical Cable for Noise Measurement]

A configuration example of an underwater noise monitoring system according to the present example embodiment is the same as that of the underwater noise monitoring system 300 according to the first example embodiment illustrated in FIG. 1. However, an optical cable 920 according to the present example embodiment is a general optical cable used for a purpose of communication, electric power transmission, and the like.

The optical cable 920 may also be used in combination with another purpose such as optical communication, a cable-type wave gauge, and a cable-type ocean bottom seismometer. Providing a plurality of optical fiber core wires within an optical cable, or even within a same optical fiber core wire, differentiating a wavelength from one another allows a noise sensing function to co-exist.

Since the optical cable 920 is not manufactured and installed for the purpose of underwater noise monitoring, there are various types, coatings, installation methods, and the like for the cable. Therefore, it is desirable to confirm a characteristic as a sound sensor, and perform correction processing in such a way to bring acquired sound data as close as possible to a signal from which an influence thereof is eliminated. The underwater noise information processing device 120 in FIG. 1 performs the correction, for example, in processing 1 in FIG. 4.

Herein, a difference in a type or coating of an optical cable is, for example, a difference in a cross-sectional structure depending on whether the optical cable is for electric power transmission or communication, and the like, a difference in a structure of protective coating (presence or absence of an exterior steel wire or a type thereof), and the like. Further, a difference in an installation method is, for example, a difference between a method of simply placing an optical cable on a surface of seabed, a method of burying an optical cable by digging a groove in seabed, and the like.

By these differences, it can be regarded that a transfer function (filter function) by which a specific frequency range is attenuated or emphasized is applied to acquired sound data.

[Unevenness of Sensor Characteristic: Unique Correction]

Since these differences in an optical cable at each place can be known by referring to a manufacturing record (e.g., a straight line diagram: SLD) and a construction record (e.g., a route position list: RPL), the differences can be almost uniquely corrected for each place of the optical cable 920. A specific correction method is, for example, increasing an amplitude of sound data of a specific frequency band by using a filter.

[Unevenness of Sensor Characteristic: Difference for each Measuring Point and Calibration]

A cause of a fluctuation of a sensor characteristic at each measuring point of the installed optical cable 920 is not only a cause that is uniquely determined (estimable) from the above-described construction record or the like. For example, even in a construction record in which the optical cable 920 is buried at a constant depth, actually, there may be a case that a burying depth varies for each place, or covered earth and sand are partially washed away and the optical cable 920 is exposed.

As a measure against this problem, a method is conceived in which calibration is performed by utilizing a sound transferred in a wide range on-site, as a reference sound. As a reference sound, a naturally generated sound may be utilized, as well as an artificial sound. In that case, since the same sound is observed at each measuring point on the optical cable 920, the underwater noise information processing device 120 derives a correction coefficient for each measuring point in such a way that these sounds approach an identical value, or approach a value according to a distance from a sound source.

Further, this calibration also enables to recognize suitability of intended noise measurement at each point on the optical cable 920. The suitability is, for example, that sensitivity at a certain point is very low and correction cannot be completed, a sound at a certain point is likely to resonate with a specific frequency band and correction is also difficult, and the like. These measuring points where noise measurement is somewhat difficult can be extracted, for example, by comparing with a moving average of sound data at preceding and succeeding measuring points. Monitoring accuracy can be improved by excluding these measuring points where noise measurement is somewhat difficult, while paying attention to a distribution of measuring points and utilizing sound data from a measuring point where it is presumed that almost average noise measurement can be acquired.

The correction processing described above in the second example embodiment may also be performed with respect to an optical cable manufactured for noise monitoring and installed for noise monitoring. In that case, further improvement of measurement accuracy is expected.

Advantageous Effect

An underwater noise monitoring system according to the present example embodiment has a similar configuration to that of the underwater noise monitoring system according to the first example embodiment, and provides a similar advantageous effect. In addition to the above, the underwater noise monitoring system according to the present example embodiment provides a means for adding a noise monitoring function to an existing optical cable for communication or electric power transmission. Thus, the underwater noise monitoring system according to the present example embodiment provides an advantageous effect of facilitating construction of a noise monitoring network over a wide sea area.

Third Example Embodiment

In the first and second example embodiments, a noise evaluating method is a method in which analysis for each frequency band is performed, but determination as to whether noise is in compliance with regulation is performed by evaluating a total amount of noise included therein. In contrast, the third example embodiment is an example embodiment related to an underwater noise information processing device 120 that performs classification processing of an individual noise source, in addition to the operation performed in the first and second example embodiments. Hereinafter, a point in which the underwater noise information processing device 120 according to the present example embodiment differs from the underwater noise information processing device 120 according to the first and second example embodiment is mainly described.

[Needs of Classifying Sound Source of Acquired Sound Data]

Acquired sound data include sound data from a plurality of sound sources. The sound sources are an artificial sound source and a sound source derived from the nature. There is a need of evaluating sound data after target noise is classified from among these pieces of sound data.

For example, there is an idea that noise should be evaluated after eliminating, from total amount regulation on noise, noise derived from the nature. Underwater noise derived from the nature includes wave noise on a surface of sea, noise of waves washing against a shore, a sound emitted by marine life, and the like.

Further, there is need of classifying noise by a factor of occurrence, even when the noise is artificial. For example, there is a need of distinguishing noise of a piling work and a sailing sound (an engine sound and a propeller sound) of a ship. Further, even in a case in which sound sources are of the same type, there is also a need of distinguishing an individual noise source.

Unique processing for distinguishing sounds to be performed by the underwater noise information processing device 120 are roughly classified into the following three pieces of processing. A first piece of processing is processing of catching a sound at a plurality of measuring points, and distinguishing a sound source from a positional relation between individual measuring points and the sound source. Further, there is a case in which a position of a sound source is fixed, and a case in which a position of a sound source moves, and the processing is processing of distinguishing these cases. Since the present example embodiment facilitates disposing a sound sensor in a distributed manner in a wide range also including a moving range of a sound source, implementation of both pieces of processing are facilitated.

A second piece of processing is processing of distinguishing a noise source by feature by using a feature of each noise source as a classification key. In this distinguishing processing, there are a level of distinguishing a type, and a level of distinguishing an individual sound source among sound sources of the same type.

A third processing is processing of tracking a moving sound source by using a movement model.

[Part 1: Distinguishing from Positional Relation between Sound Source and Measuring Point]

Herein, it is assumed that the underwater noise information processing device 120 accurately recognizes a geographical coordinate (including a water depth) of each measuring point on the optical cable 920, and the measuring points are sufficiently widely distributed around a sound source.

As far as the number of sound sources whose position is unclear is one, it is possible to estimate a position of a sound source by a sound volume at each measuring point on a cable, or a difference in sound arrival time. Further, a direction can be narrowed down in a manner of an array antenna.

Further, as far as there are a plurality of sound sources whose positions are clear, it is possible to estimate which sound measured at each measuring point is output from which noise source. Further, even when a sound source is moving, estimation can be performed in a similar manner as far as a position of the sound source can be recognized.

Further, in a case in which a sound source moves, estimation accuracy can be increased by applying the sound source to a movement model to be described later.

Further, as described in the first example embodiment, when operation information on each sound source is available, estimation accuracy can be further increased.

[Part 2: Distinguishing by Feature of Sound]

Herein, it is assumed that the underwater noise information processing device 120 holds in advance, as a classification condition, a feature unique to each noise whose cause is known. The underwater noise information processing device 120 identifies/classifies a type of noise by means of the feature. The feature to be used as the classification condition is, for example, a feature present in a frequency of noise, a change over time of a frequency, a change over time of an intensity envelope, and the like. The underwater noise information processing device 120 may use, as a classification method at a time of classification, a technique such as analogy determination, pattern identification, machine learning, and the like in combination.

It is more desirable that the underwater noise information processing device 120 performs noise classification processing after dividing sound data by frequency band, as described in the first example embodiment. In that case, the underwater noise information processing device 120 identifies/classifies, as known noise, each piece of sound data divided for each band. The underwater noise information processing device 120 may also classify a type of noise, based on a combination of detection results of these plurality of frequency bands.

When a type of noise that is not required to be detected but whose amplitude is large and a type of noise to be measured are present at the same time, by classifying sound data after dividing the sound data into frequency bands, there is a possibility that these noises can be separated by a frequency band. This enables more reliable classification.

Further, since a data size greatly differs depending on a frequency band, there is also an advantage that dividing for each frequency band facilitates arithmetic processing such as pattern identification.

The underwater noise information processing device 120 classifies a type of known noise included in acquired sound data with reference to a classification condition, computes a statistical value of intensity for each type of noise, and determines presence or absence of an excess with respect to a regulation value. Processing of computing a statistical value of intensity and performing excess determination is the same as that described in the first example embodiment.

A noise classification condition is prepared in advance in such a way that noise can be accurately classified even when an installation status or the like of the optical cable 920 is changed. The underwater noise information processing device 120 finds, for example, a feature of a type of individual noise that is less likely to be affected by an installation status or the like of an optical cable, and performs the classification, based on the feature. In a case in which a type of identical noise cannot be accurately classified in one classification condition due to an installation status or the like of the optical cable 920, the underwater noise information processing device 120 associates a classification condition with a type of identical noise in such a way that the noise can be detected by any one of a plurality of classification conditions.

In order to enhance accuracy of these classifications, it is effective to acquire in advance a large number of pieces of example data on each type of noise, find a feature being present only in specific noise, and setting the feature as a classification condition. In a case in which the number of pieces of example data is not sufficient, it is desirable to enhance reliability of a classification condition by simulatively generating noise and acquiring, by the optical cable 920 placed in various statuses, a sound/vibration at a time of generating the noise.

For example, example data on noise made by a piling machine are collected for a plurality of cases that are different in piling power, submarine soil quality, or the like. Further, example data on an earthquake or a sound of thunder are collected for a plurality of cases. A feature that is seldom included in an earthquake or a sound of thunder and is commonly observed in noise made by a piling machine is set as a classification condition.

[Part 3: Identification/Tracking of Moving Sound Source]

In a case in which a noise source moves as in a case of a sailing ship, the underwater noise information processing device 120 can track the sound source by having a model in which an object making a sound is moving. Assuming that a same sound source is moving enables to increase identification accuracy, as compared with a case in which a sound source is newly identified each time. Further, it becomes possible to recognize, from a movement model, a velocity and a traveling direction of a sound source, and to predict sound data in a near future.

As one example, a case is considered in which a ship is sailing a sea area a little far from the optical cable 920. When the ship is loaded with an AIS transponder, and identification and position information recognition of the ship can be performed from the AIS, maintaining and updating a movement model of a sound source is easy. Further, even in a case in which position information from the AIS cannot be referred to, as far as individual identification by means of a feature of a sound can be performed, a sound source can be tracked by applying a movement model.

It is assumed that the underwater noise information processing device 120 includes in advance, as a classification condition, a feature pattern of noise made when a ship sails. The underwater noise information processing device 120 detects, at a plurality of positions on an optical cable, that the feature pattern of the noise made when a ship sails is present in acquired RAW data. Similar detection is repeated, and the underwater noise information processing device 120 roughly recognizes a velocity and a traveling direction of the ship by applying these patterns to a movement model.

Since a place to be detected next can be expected from a movement model, a possibility that noise of a same type is detected again in a vicinity of an expected point is high.

Therefore, it is possible to lower a probability of misclassification occurs in the underwater noise information processing device 120 due to new identification, by lowering a detection threshold value of a type of the noise, or the like. Further, it is also possible to allow the underwater noise information processing device 120 to examine a point that is expected to be detected next, in more spatial and temporal details.

For example, when noise of a sailing ship can be tracked by applying the noise to a ship movement model, the underwater noise information processing device 120 can specify a ship sailing while making loud noise, and it is also enabled to ask the ship for improvement and the like.

Processing of identifying and tracking a same sound source as described above can be performed not only with respect to an underwater sound, but also with respect to vibration transmitted through the ground of seabed.

Advantageous Effect

An underwater noise monitoring system according to the present example embodiment has a similar configuration to that of the underwater noise monitoring system according to the first and second example embodiments, and provides a similar advantageous effect. In addition to the above, the underwater noise monitoring system according to the present example embodiment classifies a type of noise, and determines, for each type of noise, whether a noise regulation value is exceeded. This allows the underwater noise monitoring system according to the present example embodiment to facilitate noise monitoring in a case in which a noise regulation value is set for each type of noise, or the like.

In the above-described example, an example has been described in which an optical cable including an optical fiber is installed in an ocean. However, an optical cable may be installed in a sea other than an ocean such as a bay or the Caspian Sea, a lake or a pond, a river, or a canal. In that case, the underwater noise monitoring system according to the example embodiment is an underwater noise monitoring system for monitoring underwater noise present in water of a sea, a lake or a pond, a river, or a canal.

FIG. 9 is a block diagram illustrating a configuration of an underwater noise monitoring system 140x, which is a minimum configuration of an underwater noise monitoring system according to an example embodiment. The underwater noise monitoring device 140x includes a processing unit 140ax and an output unit 140bx. The processing unit 140ax derives, by using data representing noise or vibration at each position of an optical fiber being acquired by the optical fiber installed underwater or on a bottom of water, a statistical value of an amount of the noise or vibration at a time and a place when and where the data are acquired. The output unit 140bx outputs the statistical value.

Since the underwater noise monitoring device 140x monitors underwater noise or vibration by utilizing an optical fiber of an optical cable installed underwater, it is easy to dispose a large number of noise measuring points in a distributed manner. Therefore, the underwater noise monitoring device 140x provides an advantageous effect described in the section of [Advantageous Effects of Invention], by the above-described configuration.

While each example embodiment according to the present invention has been described above, the present invention is not limited to the above-described example embodiments, and modification, replacement, and adjustment can be added within a range that does not depart from a fundamental and technical idea of the present invention. For example, a configuration of an element illustrated in each drawing is one example for aiding understanding of the present invention, and the present invention is not limited to a configuration illustrated in these drawings.

A part or all of the above-described example embodiments may also be described as the following supplementary notes, but is not limited to the following.

Supplementary Note 1

An underwater noise monitoring device including:
a processing unit that derives, by using data representing noise or vibration at each position of an optical fiber installed underwater or on a bottom of water, the data being acquired by the optical fiber, a statistical value of an amount of the noise or vibration at a time and the position when and where the data are acquired; and
an output unit for outputting the statistical value.

Supplementary Note 2

The underwater noise monitoring device according to supplementary note 1, wherein the statistical value is an average value or a peak value of an amplitude or an intensity of the noise or vibration.

Supplementary Note 3

The underwater noise monitoring device according to supplementary note 1 or 2, wherein the processing unit derives the statistical value by using, among the acquired data, the data on the position at which a distance from a source of the noise or vibration corresponds to a distance being specified separately.

Supplementary Note 4

The underwater noise monitoring device according to any one of supplementary notes 1 to 3, wherein the processing unit computes the statistical value regarding the amount of the noise or vibration for each frequency band.

Supplementary Note 5

The underwater noise monitoring device according to any one of supplementary notes 1 to 4, further including a determination unit that performs determination, from the statistical value, as to whether an amount of the noise or vibration exceeds a set value.

Supplementary Note 6

The underwater noise monitoring device according to any one of supplementary notes 1 to 5, wherein the processing unit distinguishes the data by using operation information on a source of the vibration or noise, and then derives the statistical value.

Supplementary Note 7

The underwater noise monitoring device according to any one of supplementary notes 1 to 6, wherein the optical fiber is included in an optical cable, and the processing unit performs processing of, based on information being input separately and related to a type of the optical cable or an installation method of the optical cable, reducing, from the amount, an influence on sensitivity due to a difference in a type of the optical cable or an installation method of the optical cable.

Supplementary Note 8

The underwater noise monitoring device according to any one of supplementary notes 1 to 6, wherein the optical fiber is included in an optical cable, and the processing unit performs processing of acquiring, by using a reference sound transmitted in a wide range of the optical cable, a degree of difference in a position where the data on the amount are acquired, and reducing, from the amount, a difference in sensitivity due to a position where the data are acquired, based on information on the degree of difference, or selects a position where the amount is to be acquired.

Supplementary Note 9

The underwater noise monitoring device according to any one of supplementary notes 1 to 8, further including a source identification unit that identifies, from a feature of the noise or vibration being acquired from the data by the processing unit, a type or a position of a source of the noise or vibration.

Supplementary Note 10

The underwater noise monitoring device according to supplementary note 9, wherein the source identification unit performs, from a candidate position of the source being input separately and a position where the data are acquired, the identification of the source.

Supplementary Note 11

The underwater noise monitoring device according to any one of supplementary notes 1 to 10, wherein the processing unit estimates and monitors, from the data, a position of a source of the noise or vibration.

Supplementary Note 12

The underwater noise monitoring device according to supplementary note 11, wherein the processing unit spatially separates and monitors a plurality of the sources by using, as a sensor array output, the noise or vibration detected at a plurality of positions of the optical fiber.

Supplementary Note 13

The underwater noise monitoring device according to any one of supplementary notes 1 to 12, wherein the processing unit tracks and monitors a moving source of the noise or vibration by applying the source to a movement model.

Supplementary Note 14

The underwater noise monitoring device according to supplementary note 5, wherein the processing unit sends, to an external system, control information for controlling in such a way that the amount falls below the set value.

Supplementary Note 15

The underwater noise monitoring device according to any one of supplementary notes 1 to 6, wherein the optical fiber is included in an optical cable, and the optical cable is shared for another purpose by dividing optical fiber core wires, or dividing a wavelength.

Supplementary Note 16

The underwater noise monitoring device according to any one of supplementary notes 1 to 15, further including a data acquisition unit that acquires the data by the optical fiber, and sending the acquired data to the processing unit.

Supplementary Note 17

An underwater noise processing method including:
deriving, by using data representing noise or vibration at each position of an optical fiber installed underwater or on a bottom of water, the data being acquired by the optical fiber, a statistical value of an amount of the noise or vibration at a time and the position when and where the data are acquired; and
outputting the statistical value.

Supplementary Note 18

An underwater noise processing program causing a computer to execute:
processing of deriving, by using data representing noise or vibration at each position of an optical fiber installed underwater or on a bottom of water, the data being acquired by the optical fiber, a statistical value of an amount of the noise or vibration at a time and the position when and where the data are acquired; and
processing of outputting the statistical value.

Supplementary Note 19

The underwater noise monitoring device according to supplementary note 1, wherein the processing unit associates the position with a geographical coordinate.

Supplementary Note 20

The underwater noise monitoring device according to supplementary note 1, wherein the processing unit performs classification of the noise or vibration after excluding a portion in which a sound to be detected is not included.

Supplementary Note 21

The underwater noise monitoring device according to supplementary note 9, wherein the processing unit derives a distance between the source and each measuring point by using a time taken for a sound emitted from a vicinity of the source to reach each measuring point.

Herein, the "optical fiber" in the supplementary notes is, for example, the optical fiber 200 in FIG. 1, or an optical fiber included in the optical cable 920 in each of FIG. 2A and FIG. 2B. Further, the "position" is, for example, the above-described measuring point. Further, the "data representing noise and vibration" are, for example, the above-described sound data or RAW data.

Figure 7:
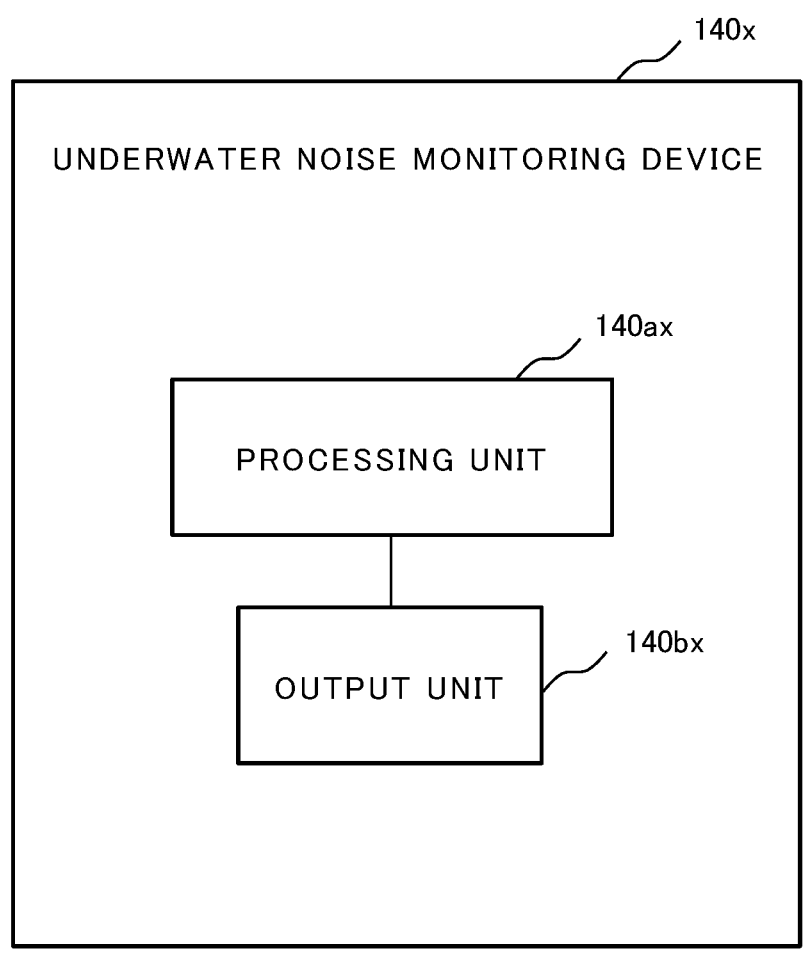
FIG. 7 is a block diagram illustrating a minimum configuration of an underwater noise monitoring device according to an example embodiment.

Further, the "processing unit" is, for example, the underwater noise information processing device 120 in FIG. 1, or the processing unit 120ax in FIG. 7. Further, the "output unit" is, for example, a portion for outputting a result of the processing 6 in FIG. 4 in the underwater noise information processing device 120 in FIG. 1, or the output unit 120bx in FIG. 7. Further, the "underwater noise monitoring device" is, for example, the underwater noise information processing device 120 in FIG. 1, or the underwater noise monitoring device 140x in FIG. 7. Further, the "optical cable" is, for example, the optical cable 920 in each of FIG. 2A and FIG. 2B. Further, the "data acquisition unit" is, for example, the interrogator 100 in FIG. 1.

Further, the above-described underwater noise monitoring system is, for example, the underwater noise monitoring system 300 in FIG. 1. Further, the above-described computer is a computer included in the underwater noise information processing device 120 in FIG. 1. Further, the above-described underwater noise monitoring program is a program causing the above-described computer to execute processing.

While the invention has been particularly shown and described with reference to exemplary embodiments thereof, the invention is not limited to these example embodiments. It will be understood by those of ordinary skill in the art that various changes in form and details may be made therein without departing from the spirt and scope of the present invention as defined by the claims.

This application is based upon and claims the benefit of priority from Japanese patent application No. 2020-136553, filed on Aug. 13, 2020, the disclosure of which is incorporated herein in its entirety by reference.

REFERENCE SIGNS LIST

100 Interrogator
101 Acquisition processing unit
103 Light source unit
104 Modulation unit
105 Detection unit
120 Underwater noise information processing device
120ax Processing unit
120bx Output unit
140, 140x Underwater noise monitoring device
200, 201, 202 Optical fiber
211 Optical coupler
300 Underwater noise monitoring system
920 Optical cable

The invention claimed is:

1. An underwater noise monitoring device comprising:
a processor configured to derive, by using data representing noise or vibration at each position of an optical fiber included in an optical cable installed underwater or on a bottom of water, the data being acquired by the optical fiber, a statistical value of an amount of the noise or vibration at a time and the position when and where the data are acquired; and
an output circuit configured to output the statistical value,
wherein the processor is further configured to perform processing of, based on information of the optical cable at each place, the information being input separately and related to a type of the optical cable or an installation method of the optical cable, reducing, from the amount, an influence on sensitivity due to a difference in the type of the optical cable or the installation method of the optical cable.

2. The underwater noise monitoring device according to claim 1, wherein the statistical value is either an average value or a peak value of either an amplitude or an intensity of either the noise or vibration.

3. The underwater noise monitoring device according to claim 1, wherein the processor derives the statistical value by using, among the acquired data, the data on the position at which a distance from a source of the noise or vibration corresponds to a distance being specified separately.

4. The underwater noise monitoring device according to claim 1, wherein the processor computes, for each frequency band, the statistical value regarding the amount of the noise or vibration.

5. The underwater noise monitoring device according to claim 1, further comprising a determination circuit configured to perform determination, from the statistical value, as to whether an amount of the noise or vibration exceeds a set value.

6. The underwater noise monitoring device according to claim 1, wherein the processor distinguishes the data by using operation information on a source of the vibration or noise, and then derives the statistical value.

7. The underwater noise monitoring device according to claim 1, further comprising source identification circuit configured to identify, from a feature of the noise or vibration being acquired from the data by the processor, a type or a position of a source of the noise or vibration.

8. The underwater noise monitoring device according to claim 7, wherein the source identification circuit performs, from a candidate position of the source being input separately and a position where the data are acquired, the identification of the source.

9. The underwater noise monitoring device according to claim 1, wherein the processor estimates and monitors, from the data, a position of a source of the noise or vibration.

10. The underwater noise monitoring device according to claim 9, wherein the processor spatially separates and monitors a plurality of sources by using, as a sensor array output, the noise or vibration detected at a plurality of positions of the optical fiber.

11. The underwater noise monitoring device according to claim 1, wherein the processor tracks and monitors a moving source of the noise or vibration by applying the source to a movement model.

12. The underwater noise monitoring device according to claim 1, further comprising data acquisition circuit configured to acquire the data by the optical fiber, and sending the acquired data to the processor.

13. An underwater noise processing method comprising:
deriving, by using data representing noise or vibration at each position of an optical fiber included in an optical cable installed underwater or on a bottom of water, the data being acquired by the optical fiber, a statistical value of an amount of the noise or vibration at a time and the position when and where the data are acquired; and
outputting the statistical value,
wherein the underwater noise processing method further comprises processing of, based on information of the optical cable at each place, the information being input separately and related to a type of the optical cable or an installation method of the optical cable, reducing, from the amount, an influence on sensitivity due to a difference in the type of the optical cable or the installation method of the optical cable.

14. A tangible and non-transitory recording medium recording an underwater noise processing program causing a computer to execute:
processing of deriving, by using data representing noise or vibration at each position of an optical fiber included in an optical cable installed underwater or on a bottom of water, the data being acquired by the optical fiber, a statistical value of an amount of the noise or vibration at a time and the position when and where the data are acquired; and processing of outputting the statistical value, wherein the underwater noise processing program is further configured to cause the computer to execute processing of, based on information of the optical cable at each place, the information being input separately and related to a type of the optical cable or an installation method of the optical cable, reducing, from the amount, an influence on sensitivity due to a difference in the type of the optical cable or the installation method of the optical cable.

15. The underwater noise monitoring device according to claim 1, wherein the processor associates the position with a geographical coordinate.

16. The underwater noise monitoring device according to claim 1, wherein the processor performs classification of the noise or vibration after excluding a portion in which a sound to be detected is not included.

\* \* \* \* \*